C. R. STURDEVANT.
APPARATUS FOR TESTING RAIL BONDS.
APPLICATION FILED MAR. 31, 1909.
933,597.
Patented Sept. 7, 1909.
2 SHEETS—SHEET 1.
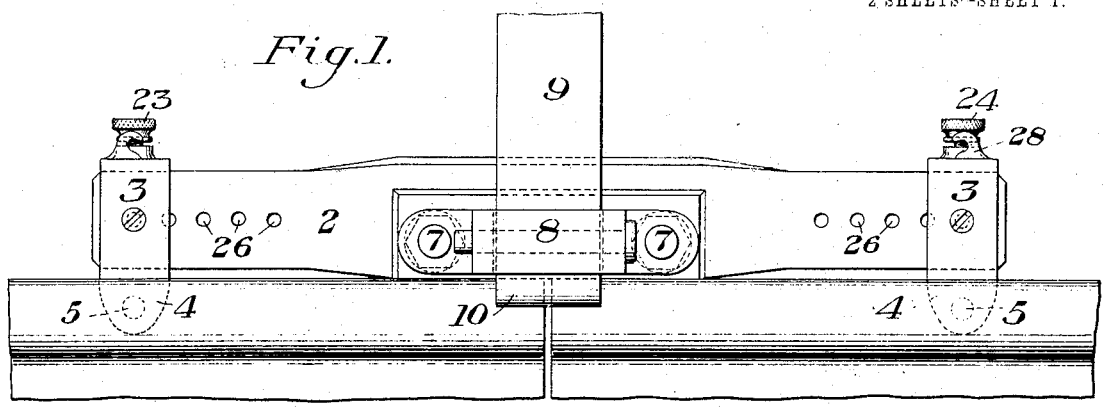
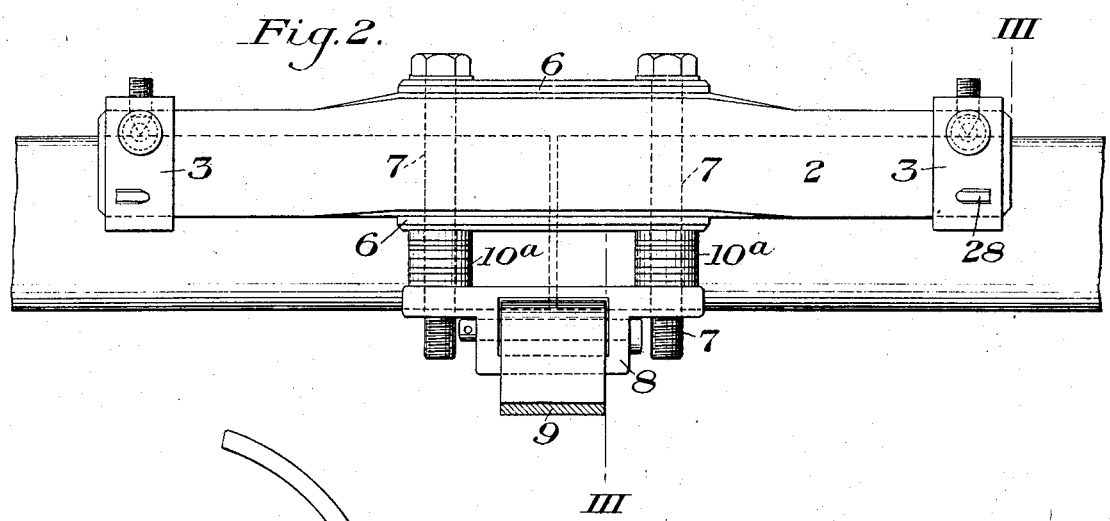
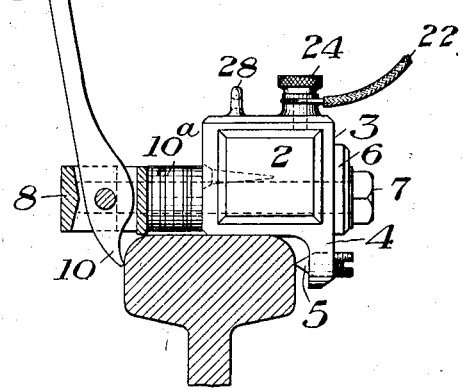
WITNESSES
R A Balderson
J. B. Bleming
INVENTOR
C. R. Sturdevant,
by Bakewell, Byrnes & Parmelee,
his Attys.

C. R. STURDEVANT.
APPARATUS FOR TESTING RAIL BONDS.
APPLICATION FILED MAR. 31, 1909.
933,597.
Patented Sept. 7, 1909.
2 SHEETS—SHEET 2.
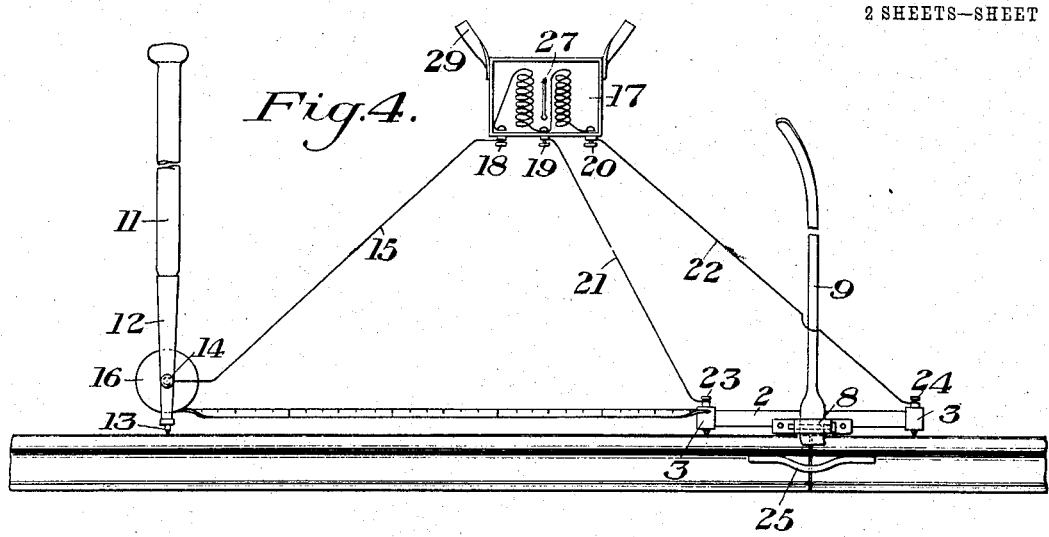

UNITED STATES PATENT OFFICE.

CHARLES R. STURDEVANT, OF WORCESTER, MASSACHUSETTS, ASSIGNOR TO AMERICAN STEEL & WIRE COMPANY, OF WORCESTER, MASSACHUSETTS, A CORPORATION OF NEW JERSEY.

APPARATUS FOR TESTING RAIL-BONDS.

933,597.  Specification of Letters Patent.  Patented Sept. 7, 1909.

Application filed March 31, 1909. Serial No. 486,950.

*To all whom it may concern:*

Be it known that I, CHARLES R. STURDEVANT, of Worcester, in the county of Worcester and State of Massachusetts, have invented a new and useful Improvement in Apparatus for Testing Rail-Bonds, of which the following is a full, clear, and exact description, reference being had to the accompanying drawings, forming part of this specification, in which—

Figure 1 is a side view, showing a portion of the apparatus applied to a track rail; Fig. 2 is a plan view of the same; Fig. 3 is a section on the irregular line III—III of Fig. 2; Fig. 4 is a diagrammatic view illustrating the use of the apparatus; and Fig. 5 is a detail view of a portion of the apparatus.

My invention has relation to apparatus for testing rail bonds, and is designed to provide means of simple and efficient character, whereby the conductivity or resistance of a rail bond may be quickly and easily ascertained.

The nature of my invention will be best understood by reference to the accompanying drawings, in which I have shown the preferred embodiment thereof, and which will now be described, it being premised, however, that various changes may be made in the details of construction and arrangement of the parts without departing from the spirit and scope of my invention, as defined in the appended claims.

In the drawings, the numeral 2 designates a piece or bar of insulating material having at each end a metallic strap 3, suitably secured thereto. Each of these straps 3 has a depending lug 4, which carries a contact point 5. Attached to the central portion of the bar by means of the side plates 6 and bolts 7 is a socket plate 8, in which is pivoted a lever 9, having a short arm or heel 10, extending below its pivot. The socket plate 8 is adjustable on the bolts 7 to adapt the device to rail heads of different widths, a plurality of washers or spacers 10ᵃ being provided for the purpose of enabling the proper adjustment to be conveniently made.

11 designates a bar, preferably of wood, to the lower end of which is secured a metallic socket piece 12, having a contact point 13, secured in its lower end and also provided with a binding post or screw 14, for the attachment of a flexible conductor 15.

Secured to the socket piece 12 is a self-winding tape measure 16.

17 designates an electric measuring or indicating instrument, which is preferably a differentially wound milli-volt meter of a well known type, having its zero point in the center of its scale. This volt meter is provided with three binding posts or screws 18, 19 and 20, the conductor 15 being connected to the binding post 18, and two flexible conductors 21 and 22 leading from the binding posts 19 and 20, respectively to binding posts 23 and 24, carried by the straps 3, at the ends of the bar 2.

25 of Fig. 4 designates a rail bond to be tested.

The apparatus is used as follows: The bar 2 is preferably provided with a plurality of holes 26, to provide for the adjustment thereon of the metal end straps 3, so that the two straps can be set at the desired distances apart corresponding to the length of the rail bond to be tested. The straps are adjusted so that the two contact points 5 will span the bond 25 to be tested, in the manner shown in Fig. 4. The bar 2 is applied to the rails in the manner shown in Figs. 1, 2 and 3, and the lever 9 is pulled to one side, thereby forcing the contact points 5 through any rust or scale which may be present on the surface of the rail and making a positive and reliable electric contact therewith. If a current be flowing through the rail, the needle 27 of the instrument 17 will be deflected in one direction, the amount of its deflection depending upon the strength of the current and the conductivity or resistance of the joint. At a short distance from the contact 5, to which the conductor 21 is connected, the contact 13 is applied to the rail in the manner shown in Fig. 4. A current will then flow through the instrument from this contact and will cause a deflection of the needle 27 in the opposite direction; and the contact 13 is moved along the rail until a point is reached where there is no deflection of the needle 27 in either direction. At this point the fall of potential in the uncut rail between the contact 13 and the nearest contact 5 will equal the drop of potential in the joint between the two contacts 5, and the resistance of this portion of the rail will be equal to the resistance of the joint. One end of the self-winding tape is connected to the adjacent end of the bar 2 (which is provided with a hook 28, for this purpose) and the length of this portion of the rail can then be read directly on this tape in feet and inches. This is the desired reading and gives the resistance of the joint, as measured by the resistance of the length of the uncut portion of the rail, so found. The instrument 17 is used simply as an index to indicate when the two potential differences are equal and when one cancels the effect of the other, the needle is at zero and no readings of the instrument are necessary, the only reading being from the tape.

The instrument can be made very sensitive and can be readily operated by one man.

The instrument can be provided with the usual multiplier, by means of which the movement of the indicator or pointer can be decreased if its deflections are too large.

If the current flows continuously through the rail, the operator can work very rapidly from joint to joint to be tested, and it is not necessary that the current through the rail be uniform.

The instrument 17 may be provided with a suitable strap 29, so that it can be passed around the neck of the operator, and thus leave his hands free for the manipulation of the contacts.

The bar 2 is preferably provided with one of the hooks 28, at each end, so that it can be applied to the rail either end to.

It will be obvious that various changes may be made in the details of construction and arrangement. Thus, the bar 2 may be of various forms, the contacts can be carried thereby in different ways, and other details can be changed.

I claim:

1. Apparatus for the purpose described, comprising a differentially wound indicating or measuring instrument, having its windings arranged to produce opposite effects upon an indicating device, a contact carrier having contacts insulated from each other and arranged to span the bond to be tested, flexible conductors for connecting the contacts with the measuring instrument, another contact device movable toward and away from the first named contact device and also having a connection with the windings of the instrument, and means for measuring the distance between the last named contact device and one of the first named contact devices, substantially as described.

2. Apparatus for the purpose described, comprising a portable measuring or indicating instrument, contact devices for making contact with a track rail at opposite sides of a rail bond and also at a variable distance from the bond at one side thereof, flexible conductors connecting the contact with the windings of the instrument, and means for measuring or indicating the distance between the last named contact and one of the first named contacts, substantially as described.

3. In apparatus of the character described, a bar having a contact point adapted to engage a track rail, another bar or support also having a contact point, and a measuring tape carried by one of said bars and arranged to be used to indicate the distance between the two contacts; substantially as described.

4. In apparatus of the character described, a bar or support, a pair of contacts adjustably mounted on said bar or support and insulated from each other, another bar or support having a contact point, a measuring tape carried by the last named bar or support, and means on the first named bar or support for engagement with the free end of the measuring tape, substantially as described.

In testimony whereof, I have hereunto set my hand.

CHARLES R. STURDEVANT.

Witnesses:
WM. A. BACON,
G. SAMPSON.